United States Patent [19]
Edwards et al.

[11] Patent Number: 6,164,131
[45] Date of Patent: *Dec. 26, 2000

[54] IN-GROUND RECEPTACLE FOR FLUID METER AND VALVES

[75] Inventors: Daniel J. Edwards; Mark J. Edwards, both of Mt. Sterling, Ky.

[73] Assignee: Mid-States Plastics, Inc., Mt. Sterling, Ky.

[ * ] Notice: This patent is subject to a terminal disclaimer.

[21] Appl. No.: 09/067,563

[22] Filed: Apr. 28, 1998

Related U.S. Application Data

[63] Continuation-in-part of application No. 08/613,872, Mar. 11, 1996, Pat. No. 5,747,687.

[51] Int. Cl.[7] .............................. G01F 15/10; G01F 15/14
[52] U.S. Cl. ................................. 73/277; 73/201; 73/273; 220/484
[58] Field of Search ............................. 73/273, 201, 277; 220/421, 444, 466, 484

[56] References Cited

U.S. PATENT DOCUMENTS

| | | |
|---|---|---|
| 3,392,867 | 7/1968 | Morris . |
| 3,913,400 | 10/1975 | Floren ........................................ 73/273 |
| 3,961,528 | 6/1976 | Ford ........................................... 73/201 |
| 4,215,798 | 8/1980 | Patterson et al. . |
| 4,305,282 | 12/1981 | Hunt ........................................... 73/201 |
| 4,448,825 | 5/1984 | Asahara . |
| 4,614,113 | 9/1986 | Daghe et al. .............................. 73/201 |
| 4,813,281 | 3/1989 | Daghe ....................................... 73/201 |
| 5,249,697 | 10/1993 | McKinnon . |

*Primary Examiner*—Harshad Patel
*Attorney, Agent, or Firm*—Frost & Jacobs LLP

[57] ABSTRACT

An in-ground receptacle for a fluid meter and/or a valve, comprising a continuous wall defining a chamber for the meter and/or valve. The wall is co-molded in three layers comprising inner and outer layers of plastic with an intermediate plastic layer having high insulative characteristics. The receptacle is provided at its upper end with an appropriate openable closure, substantially at ground level, and permitting inspection of and access to the meter and/or valve. The receptacle may have an annular interior rim near its upper end. The rim supports an insulative pad at the top of the receptacle beneath the openable closure therefor. The pad has a removable center portion enabling inspection and access to the fluid meter and/or valve. The construction of the receptacle is such as to prevent freezing of the fluid meter and/or valve.

20 Claims, 5 Drawing Sheets

6,164,131

IN-GROUND RECEPTACLE FOR FLUID METER AND VALVES

REFERENCE TO RELATED APPLICATION

The present application is a continuation-in-part of application Ser. No. 08/613,872, filed Mar. 11, 1996 in the names of the same inventors and entitled: AN IN-GROUND RECEPTACLE FOR FLUID METER AND VALVES, which issued as U.S. Pat. No. 5,747,687 on May 5, 1998.

TECHNICAL FIELD

The invention relates to an in-ground receptacle.

BACKGROUND ART

It has become common practice to locate fluid meters, valves and the like in in-ground receptacles so that they can be accessed and inspected without having to enter the building they service. A typical example is a water meter service installation located in the line from the water main to the building.

Near its bottom, the receptacle will typically have a pair of openings (usually diametrically opposed), for the inlet pipe to the water meter and the outlet pipe therefrom. In some instances the inlet and outlet pipes enter the receptacle from the bottom so that pipe openings are not required. In a typical water meter installation, it is not uncommon to locate in the inlet pipe a backflow protection device and a shut-off valve. The water meter and its appurtenances may be supported within the receptacle simply by the inlet and outlet pipes to which they are connected. Additional support means may also be provided for this purpose, as is taught, for example, in U.S. Pat. No. 3,961,528.

The receptacle of the present invention may be used to house other than water meter installations. For example it may be used with a gas meter, a water valve for an irrigation system, or the like.

In-ground receptacles of the type to which the present invention is directed have heretofore been made of various types of materials including, but not limited to, concrete, metal and plastic. U.S. Pat. No. 3,913,400 is exemplary of those teaching a meter box or receptacle made of plastic. The reference indicates that the receptacle is made of a thermoplastic material by conventional molding techniques.

The present invention is based upon the discovery that if the receptacle wall is made of three layers (i.e. a smooth plastic outer layer, a smooth plastic inner layer and an intermediate plastic layer of excellent thermal insulating properties), the receptacle demonstrates enhanced strength and excellent protection against freezing of the fluid meter or valve. The receptacle may also be provided with an interior flange near its upper end for holding an insulative pad in place just under the receptacle closure. The insulative pad is provided with a removable center portion for access to and inspection of the meter and/or valve.

DISCLOSURE OF THE INVENTION

According to the invention there is provided an in-ground receptacle for a fluid meter and/or a valve. The receptacle comprises a continuous wall defining a chamber surrounding the meter and/or valve.

The wall is co-molded in three layers. The layers comprise an outer layer of plastic, an inner layer of plastic, and an intermediate plastic layer having high insulative characteristics. Each layer is designed to serve one or more specific functions in the overall structure.

At its upper end, the receptacle is provided with an openable closure of any appropriate type well known in the art. The openable closure is usually located substantially at ground level. The openable closure enables inspection of and access to the meter and/or valve.

Near its upper end and the openable closure therefor, the receptacle has an interior rim which is preferably continuous about the inside surface of the receptacle. The rim supports an insulative pad at the top of the receptacle near the openable closure therefor. The insulative pad has a removable center for inspection and access to the fluid meter and/or valve. This construction of the receptacle prevents freezing of the fluid meter and/or valve therein.

DETAILED DESCRIPTION OF THE INVENTION

Figure 1:
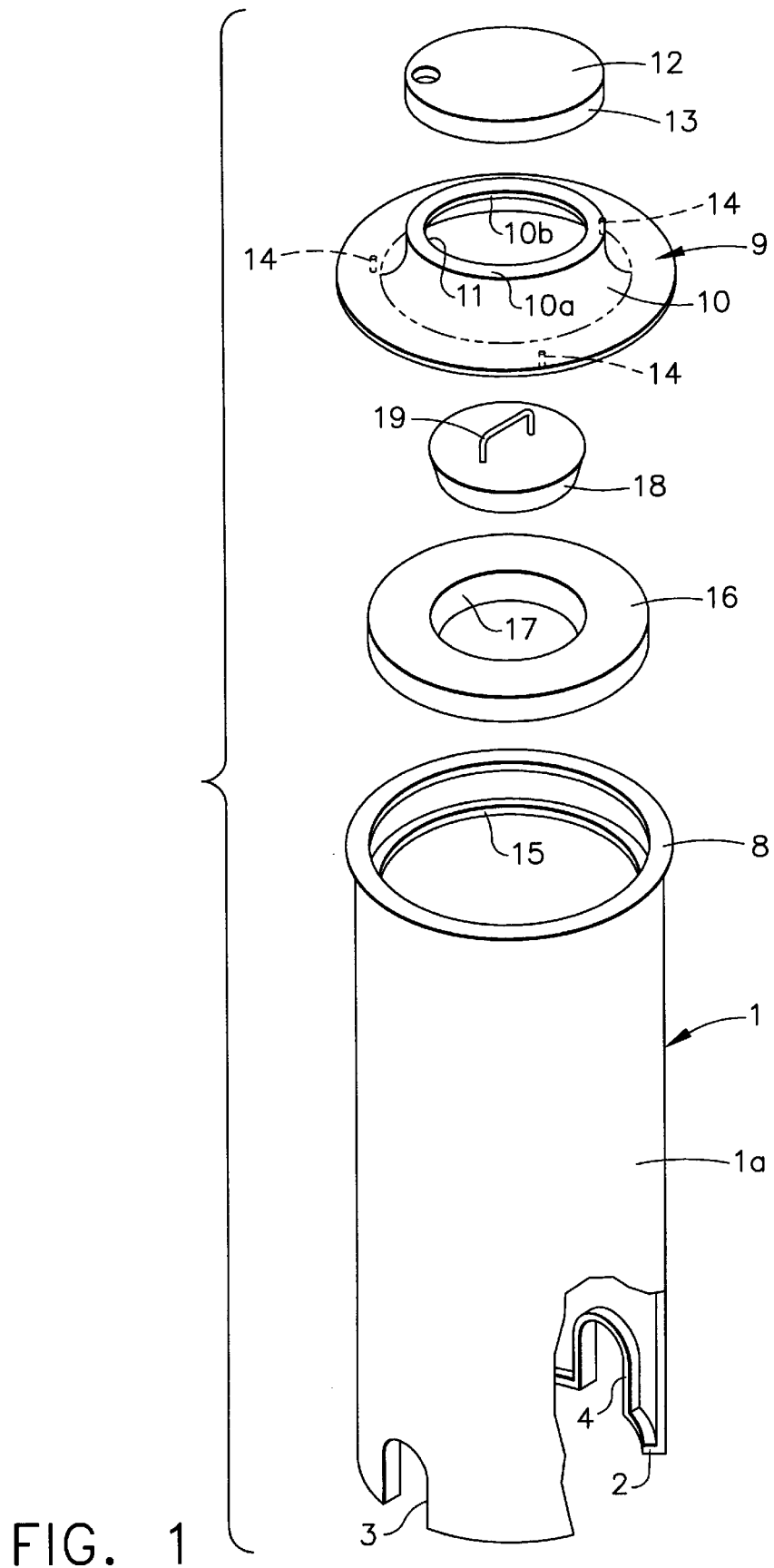
FIG. 1 is an exploded isometric view of the in-ground receptacle of the present invention and the conventional iron closure therefor.

FIG. 1 is an exploded, isometric view of the receptacle of the present invention. The receptacle, itself, is generally indicated at 1 and is shown as being cylindrical, having a circular cross-section. While this shape is preferred, it will be understood that the receptacle 1 could have any cross-sectional configuration including, but not limited to, oval, elliptical, obround, rectangular or square. The receptacle 1 is molded of plastic material as will be described hereinafter in further detail.

At its bottom end, the receptacle 1 is illustrated as terminating in a narrow in-turned flange 2. It will be noted in FIGS. 1 and 2 that the receptacle 1 is shown without a bottom. In many installations, no bottom is required, the bottom of the receptacle resting upon the bottom of the hole in the ground that it lines. It should be understood, however, that it is within the scope of the present invention to provide receptacle 1 with a bottom if so desired. The bottom may be of conventional construction and may be made of any appropriate material. It is even within the scope of the invention to make the bottom of the same type of molding used for the continuous side of the receptacle.

Figure 2:
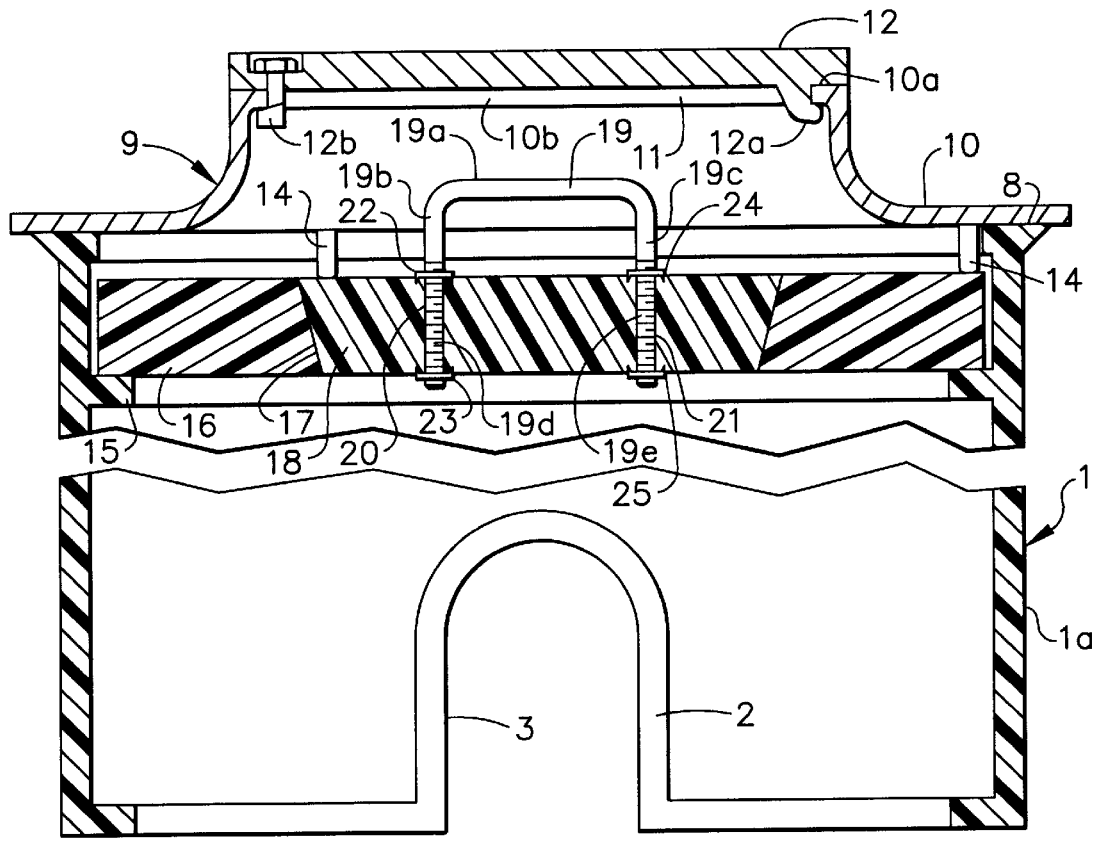
FIG. 2 is an assembled, fragmentary, cross-sectional view of the structure of FIG. 1.

At its bottom end, the receptacle is usually provided with a pair of openings 3 and 4. The openings may have any appropriate shape. In FIGS. 1 and 2 the openings are illustrated as being arch-shaped. It will be noted that the narrow rim 2 extends about each of the openings 3 and 4.

The openings 3 and 4 are provided for the inlet pipe and the outlet pipe of the meter and/or valve assembly. In some installations, the inlet pipe and the outlet pipe constitute the sole support for the meter and/or valve assembly. In other installations, additional support may be desired or required for the meter and/or valve assembly. Such additional support can be provided in a number of ways well known in the art and does not constitute a limitation of the present invention. Exemplary support devices are taught, for example, in U.S. Pat. Nos. 3,913,400 and 3,961,528.

Figure 3:
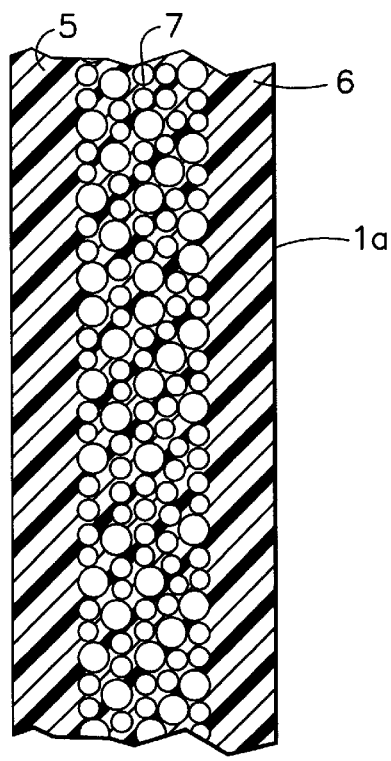
FIG. 3 is a fragmentary cross-sectional view of the wall of the receptacle.

A detailed cross-section of the continuous wall 1a of the receptacle 1 is shown in detail in FIG. 3. The wall 1a is made up of an outer layer 5, an inner layer 6, and an intermediate layer 7. Layers 5 and 6 are preferably made of polyethylene, and intermediate layer 7 preferably comprises a chemically blown or expanded polyethylene. The wall 1a constitutes a co-molding. In other words, the layers 5, 6 and 7 are molded in a single molding operation. The outside layer 5 is first introduced into the mold, followed by the intermediate layer and the inside layer. The structure is subjected to heat during the molding process, causing the intermediate layer to "blow" or expand. Thereafter, all three layers 5, 6 and 7 cure or crystalize together forming an integral, one-piece co-molding, rather than a lamination. The co-molding operation results in a structure of remarkable strength. The fact that the co-molding is made up of three layers enables each layer to be designed to serve one or more specific functions in the final co-molded structure. For example, the outside layer 5 is engineered for Environmental Stress Crack Resistance (ESCR) and structural integrity. Furthermore, it may be provided with an appropriate color, such as black, for protection against ultraviolet rays during storage out of doors. The intermediate layer is "blown" or expanded for rigidity and static physical strength. Furthermore, the intermediate layer is characterized by high thermal insulative characteristics. Finally, the inner layer 6 is engineered to provide impact resistance and may be light in color (i.e. white or the like), to assist in reading a meter or manipulating a valve located within the receptacle. The light color of the inner layer 6 serves to reflect daylight, or light from a flashlight when the receptacle 1 is open.

At its upper end, the continuous wall 1a of receptacle 1 terminates in a slightly widened upper annular surface 8. The surface 8 is adapted to support an appropriate openable closure for the receptacle 1. The openable closure is generally indicated at 9.

Prior art workers have devised many kinds of openable closures for receptacles of the type to which the invention is directed, and the nature of the closure does not constitute a limitation of the present invention. For purposes of an exemplary disclosure, the closure, generally indicated at 9, is shown in the form of an annular iron member 10, having a planer, circular, outer edge portion. From the outer edge portion the member 10 curves upwardly terminating in an upper planar edge 10a. Adjacent edge 10a the member 10 has an annular interior rim 10b defining an opening 11. The closure 9 is completed by an iron lid 12 closing opening 11. The lid 12 rests upon the edge 10a. At one point near its periphery the lid 12 has a downwardly depending hook-shaped element 12a adapted to engage rim 10b. Diametrically opposite the hook 12a the lid 12 is provided with a cam bolt 12b by which the lid may be maintained closed, as is well known in the art. The annular member 10 is adapted to rest upon and be supported by the annular upper surface 8 of receptacle 1. As is shown in FIGS. 1 and 2, the annular member 10 may be provided with a series of downwardly depending lugs 14 so positioned as to cooperate with the inner edge of the upper surface 8 of receptacle 1 to center the openable closure structure 9 thereon. As indicated above, the closure 9 may take many forms. in some instances, the lid 12 is hinged. In some installations, the annular member 10 may be partially covered with dirt or concrete.

Again referring to FIGS. 1 and 2, it will be noted that the co-molded wall 1a of receptacle 1, near the top thereof, is provided on its inside surface with an integral rim or shelf 15. The shelf 15 is intended to support an insulative pad 16. Since the embodiment of the receptacle 1 of FIGS. 1 and 2 is shown as being cylindrical, shelf 15 constitutes an annular shelf and the insulative pad 16 is shown as having a circular periphery. The insulative pad 16 is sized so that it rests upon shelf 15 as shown in FIG. 2.

Insulative pad 16 is shown as having a tapered opening 17 of greater diameter at the upper surface of the pad 16 than at its lower surface. The opening 17 is provided with a corresponding tapered closure or plug 18 provided with a handle 19.

Figure 4:
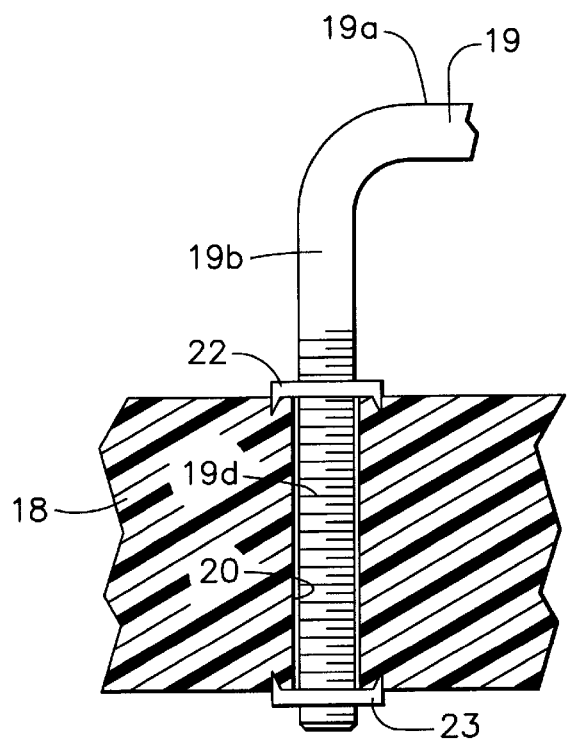
FIG. 4 is a fragmentary cross-sectional view of the removable portion of the insulative pad of the present invention and its handle.

For purposes of an exemplary showing, the handle 19 is illustrated as being a U-shaped member having a base portion 19a and downwardly depending legs 19b and 19c. The legs 19b and 19c are threaded as at 19d and 19e, respectively. The legs 19b and 19c pass through perforations 20 and 21, respectively, in plug 18. The handle 19 is affixed to plug 18 by speed nuts 22 and 23 on leg 19b and speed nuts 24 and 25 on leg 19c. The manner in which this is accomplished is illustrated in FIG. 4. The leg 19b of handle 19 is first provided with speed nut 22 engaged thereon at its desired final position. The leg 19b is then inserted through the perforation 20 in plug 18. The plug 18, about the lower end of the perforation, is slightly depressed, enabling speed nut 23 to be engaged on leg 19b. The plug 18 is then released, and both speed nuts 22 and 23 are locked in place as shown in FIG. 4. The other leg 19c is simultaneously affixed to plug 18 in the same manner.

It will be understood that the plug 19 is of such diameter that it can be readily lifted through the opening 11 defined by rim 10b in annular iron member 10. Thus, insulative pad 16 does not interfere with inspection of or access to the meter and/or valve within receptacle 1. The insulative pad 16 and its plug 18 serve to isolate the lower warmer part of the chamber defined by receptacle 1 from the upper colder part thereof.

In FIGS. 1 and 2, the insulative pad 16 and closure or plug 18 are each shown as unitary, one-piece moldings. Excellent results have been achieved when these members are molded of polyethylene closed cell foam. In an exemplary embodiment wherein the insulative pad 16 and its closure 18 had a thickness of about 2 inches, the structure demonstrated a R factor of about 7.4.

Figure 5:
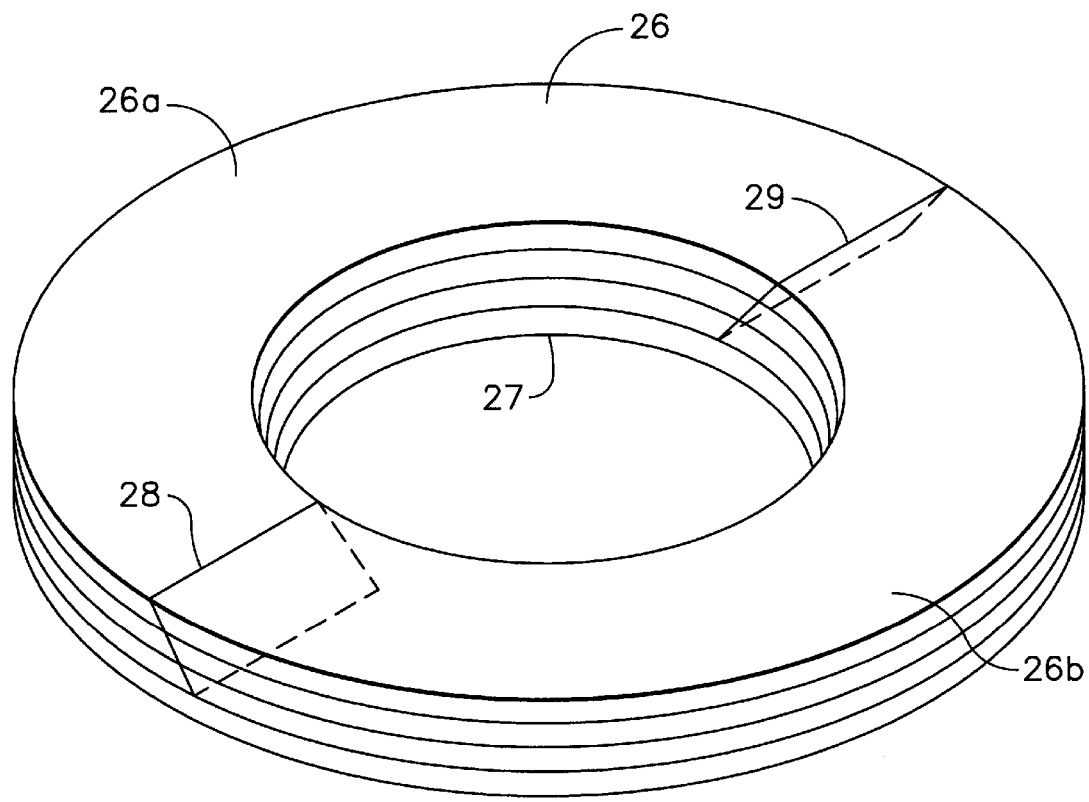
FIG. 5 is an isometric view of the insulative pad.

It would be within the scope of the present invention to fabricate the pad of laminations of molded polyethylene closed cell foam. Such a pad is illustrated in FIG. 5 at 26. Insulative pad 26 is similar to insulative pad 16, comprising an annular member having a tapered central opening 27. The primary difference lies in the fact that the insulative pad 26 is made up of 4 layers of polyethylene closed cell foam joined together by an appropriate adhesive. It will be understood that the closure or plug 18 could be of the same construction.

In some circumstances, it may be desirable to replace the insulative pad and its plug, or to retrofit an existing receptacle with an insulative pad and plug. A problem arises in an instance where the member 10 is partially covered with soil, concrete or the like, so that it is not readily removable. In such an instance, the pad 16 of FIG. 2 or the pad 26 of FIG. 5 may be provided with diametrically opposed, oppositely sloped cuts or slits which slope downwardly from the upper surface of the insulative pad and extend through about three-quarters of the overall pad thickness. Since the insulative pad 26 of FIG. 5 is made up of four separate layers of equal thickness, the slits would extend through the upper three layers. Such slits are illustrated in FIG. 5 at 28 and 29.

In the field, a blade may be inserted in the slits 28 and 29 to continue slits 28 and 29 through the final uncut portion of insulative pad 26, to sever the pad into two separate halves. Alternatively the pad may simply be broken at the positions of the slits into two separate halves. When so separated, each half can be extended through the opening 11 in the iron member 10 as defined by rim 10b. Each half of insulative pad 26 may be located on flange or shelf 15 (see FIG. 2) with the ends of insulative pad halves 26a and 26b in abutment. No adhesive need be used to rejoin the halves 26a and 26b of insulative pad 26. The geometry of the cuts 28 and 29 in insulative pad 26 and the position of the shelf 15 hold the insulative pad 26 together after installation. Because the plug 18 is tapered, it does not exert solely a downward pressure when installed, but also pushes outwardly as well. This further helps the insulative pad 26 stay in place. In this way, the insulative pad 26 may be mounted in the receptacle 1 on the interior shelf 15 thereof, even though the member 10 cannot be removed. It will be understood that the same would be true for insulative pad 16.

Again referring to FIG. 2, in an exemplary embodiment, the insulative pad 16 and plug 18 had a thickness of about 2 inches. The annular rim or shelf 15 of the receptacle 1 was located about 3 inches down from the upper surface 8 of the receptacle. The lugs 14 of the member 10 were about 1 inch long. As a result of this, when the structure was assembled, the lugs 14 of the member 10 rested on the upper surface of the insulative pad 16 holding it down in place on shelf 15.

It will be understood by one skilled in the art that the receptacle 1 and its appurtenances can be made in a number of different transverse sizes and lengths. Similarly, the continuous wall 1a can be made in various thicknesses. The intermediate layer 7 should be completely enclosed by the outer layer 5 and inner layer 6. The outer layer 5 and the inner layer 6 are preferably of substantially the same thickness, and the intermediate layer 7 is preferably about twice as thick as the outside layer 5 or the inside layer 6. In an exemplary embodiment, excellent results were achieved when the outside layer 5 and the inside layer 6 were each of a thickness of about 0.15 inch and the intermediate layer 7 was of a thickness of about 0.3 inch, giving the entire continuous wall an overall thickness of about 0.6 inch. The resulting continuous wall demonstrated excellent strength characteristics and excellent thermal insulative qualities.

It has been found that for convenience, ease in molding, and ease in handling, a maximum length for receptacle 1 should be limited to about 6 feet. When a longer receptacle is required, it is preferable to make up the receptacle of two or more segments to achieve the final desired length.

Figure 6:
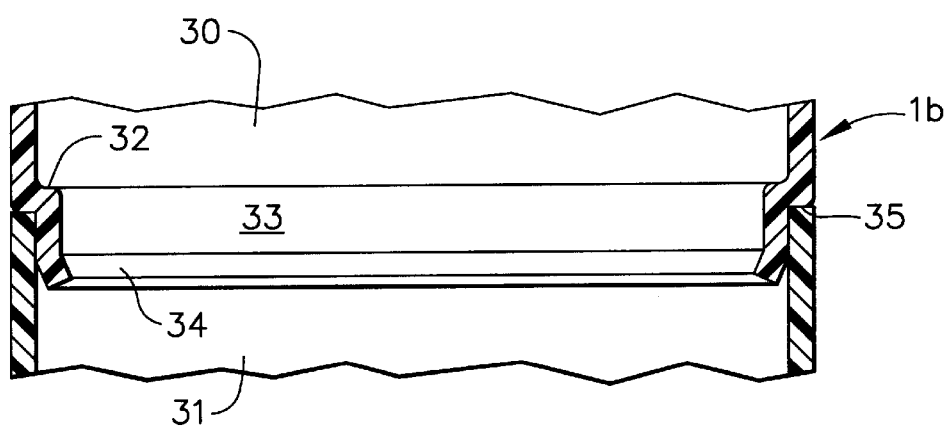
FIG. 6 is a fragmentary, cross-sectional, elevational view of the receptacle of the present invention formed of stacked segments.

FIG. 6 fragmentarily illustrates a receptacle generally indicated at 1b made up of a pair of receptacle segments 30 and 31. The upper segment 30 may be similar to the receptacle illustrated in FIG. 1 with several exceptions. First of all, the lower end of segment 30 is not provided with arched openings such as openings 3 and 4 of FIG. 1. Secondly, the bottom end of segment 30 is provided with an in-turned flange portion 32 similar to the in-turned flange 2 of FIG. 1. In this instance, however, the flange 32 terminates in a downwardly depending additional flange portion 33 ending in a slightly in-turned final flange portion 34. The flange portion 33 forms an exterior notch 35 to receive the upper end of the lower receptacle segment 31. The in-turned flange portion 34 helps to guide the flange portion 33 into the upper end of lower receptacle segment 31. It will be noted that the upper end of segment 31 is not provided with a widened surface similar to the annular surface 8 in FIG. 1. Assuming that lower receptacle segment 31 is the lowermost segment, it may be provided at its lowermost end with a flange identical to flange 2 of FIG. 1 and with openings identical to openings 3 and 4 of FIG. 1, if required. The segments 30 and 31 may be joined together in any appropriate manner. For example, an appropriate adhesive may be used for this purpose. The lower segment 31 need not be provided with an inner annular rim or shelf such as shelf 15 of FIG. 1. If a receptacle were to be made up of three segments or more, the intermediate segments would have an upper end identical to the upper end of segment 31 and a lower end identical to the lower end of segment 30.

Figure 7:
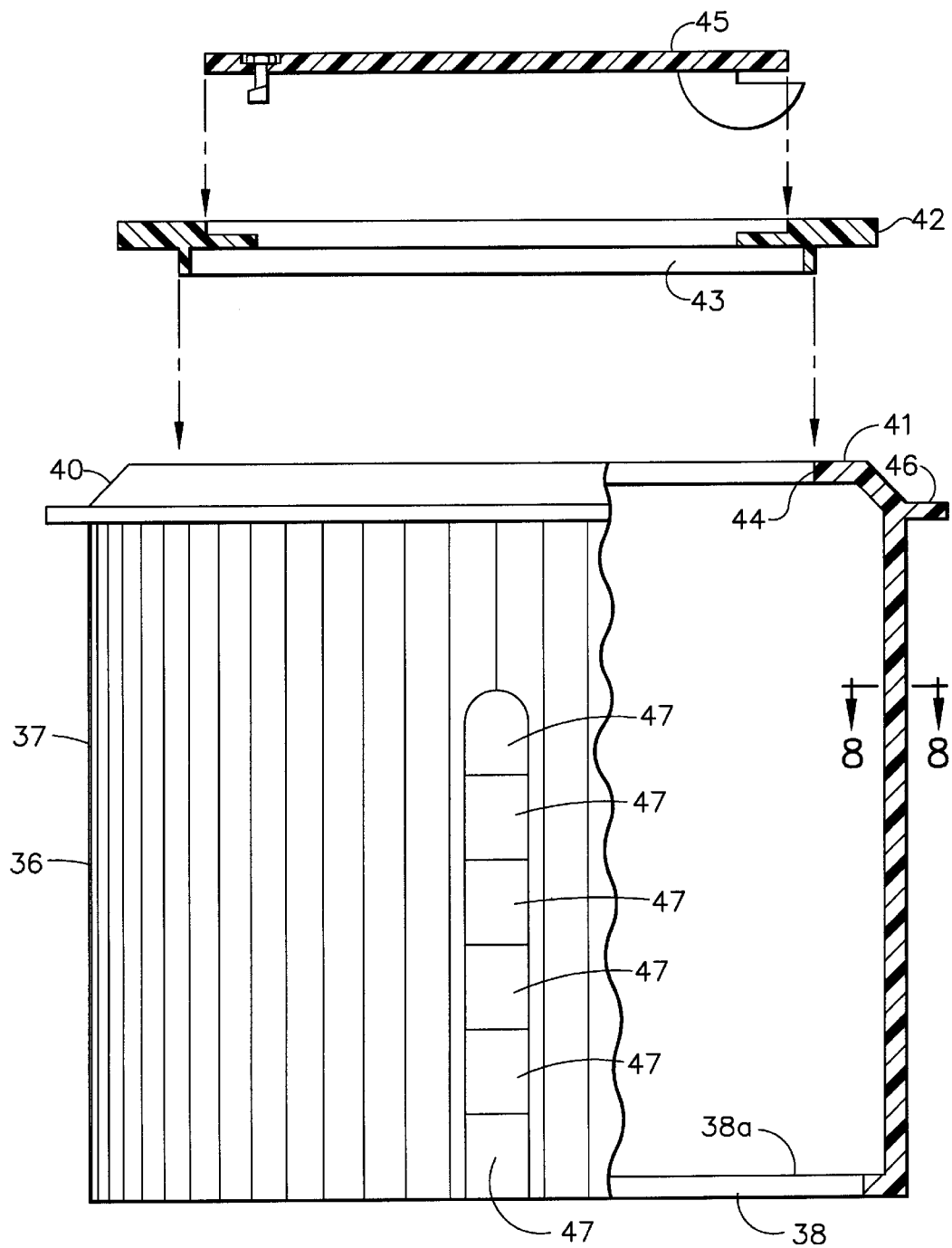
FIG. 7 is an exploded elevational view, partly in cross-section, illustrating the provision of an external annular rib.

It will be evident from the above that the inner layer of the co-molded receptacle has a plastic inner layer having an inner surface constituting the inner surface of the receptacle wall. Similarly, the co-molded receptacle has an outer layer with an outer surface constituting the outer surface of the receptacle wall. Normally, the inner and outer surfaces of the receptacle wall would be smooth and uninterrupted. However, the invention is not so limited. Reference is made to FIG. 7 which is an exploded elevational view, partially in cross-section, illustrating a receptacle of the present invention at 36. The receptacle 36 comprises a continuous wall 37 which is co-molded in the same manner, and of the same materials, described with respect to receptacle 1. The receptacle 36 has an open bottom 38 and a narrow, annular, inwardly directed flange 38a at the bottom of wall 37. The wall 37 in this particular embodiment is again illustrated as being cylindrical and has near its upper end and upwardly and inwardly sloping portion 40. The portion 40 terminates in a horizontal, inwardly extending rim 41.

For purposes of an exemplary disclosure, the receptacle 36 is shown as being provided with a closure 42 in the form of a planar, annular member with a downwardly depending flange 43 adapted to be received in the opening 44 of the receptacle defined by receptacle flange 41. A lid 45 is engaged with closure 42 in substantially the same way as described with closure 9 and lid 12 of FIG. 2.

The embodiment of FIG. 7 provides an annular exterior rib 46 at the juncture of the upper portion of cylindrical wall 37 and upwardly and inwardly sloping wall portion 40. If paving (such as concrete, black top, gravel, etc.) is located about the upper portion of the receptacle, annular rib 46 will lock the receptacle in place.

It is also within the scope of the invention to provide the exterior surface of receptacle 36 with a vertical array of outlines of inlet pipe openings 47, one-above-the other, shallowly molded in the exterior surface of receptacle 36. The purpose of this is to provide the installer with an easy way to properly locate the inlet pipe opening and to cut it out of the receptacle with an appropriate saw. A similar array of opening indications (not shown) can be molded in receptacle 36 to facilitate location and cutting of an appropriate outlet pipe opening.

Figure 8:
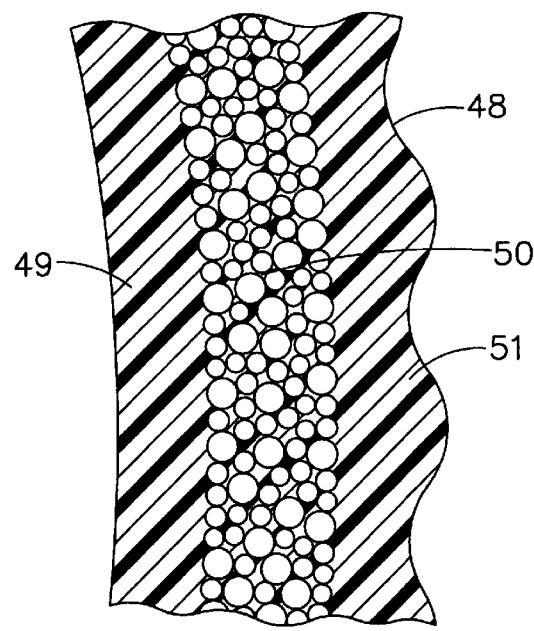
FIG. 8 is a fragmentary cross-sectional view of a receptacle wall having a corrugated configuration.

Reference is made to FIG. 8 which is a cross-sectional view of a receptacle wall 48 comprising an inner layer 49, an intermediate layer 50 and an outer layer 51. The wall differs from that shown in FIG. 3 only in that the exterior layer 51 is molded to have a corrugated configuration. In FIG. 8 the corrugations are vertical. It will be apparent to one skilled in the art that similar corrugations could be made in a horizontal fashion so as to surround the receptacle wall.

Figure 9:
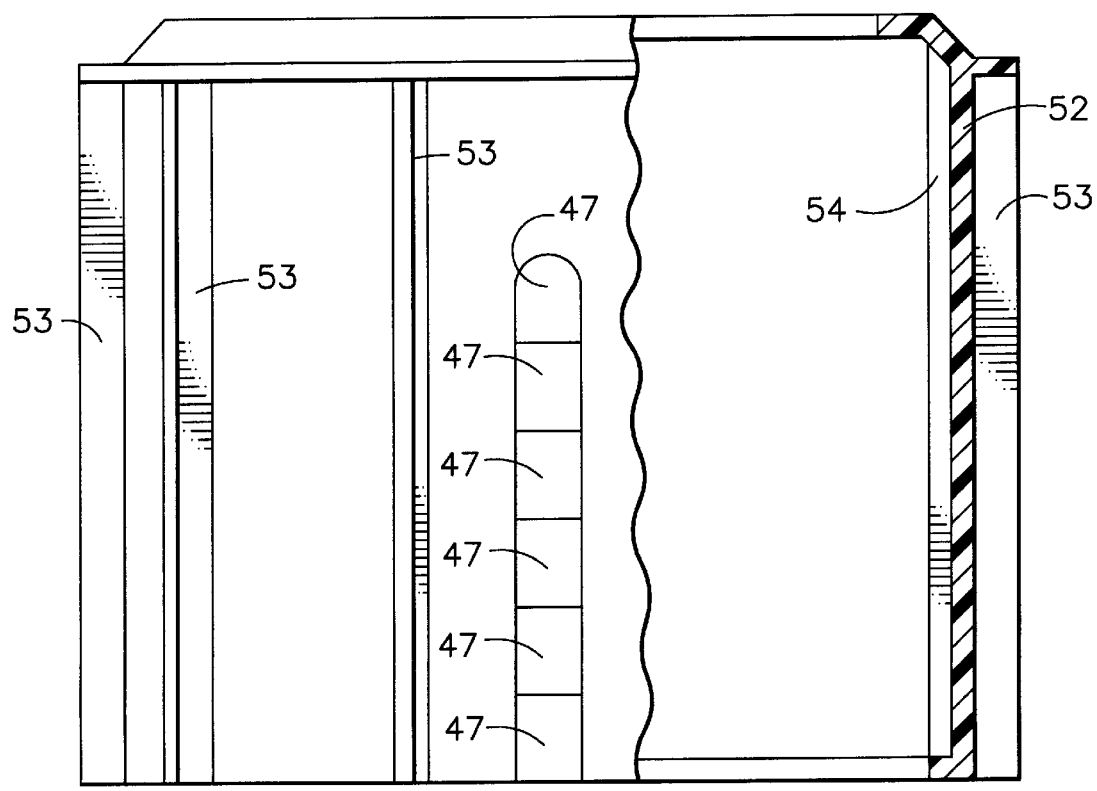
FIG. 9 is an elevational view, partly in cross-section, illustrating the use of vertical ribs.

FIG. 9 is a fragmentary elevational view, partly in cross-section, of a receptacle 52 which may be provided with vertical outer ribs 53 and/or vertical inner ribs, one of which is shown at 54.

Whether provided horizontal or vertical inner ribs or outer ribs, and whether the receptacle wall inner and outer surfaces are corrugated, smooth or textured, the wall is still a co-molded structure of the type described above.

Modifications may be made in the invention without departing from the spirit of it.

What is claimed:

1. An in-ground receptacle comprising a first segment, said first segment having a continuous wall defining a chamber, said wall comprising a co-molded structure having a plastic inner layer, a plastic outer layer and an intermediate plastic layer having high thermal insulative properties, said inner layer having an inner surface constituting the inner surface of said wall, said outer layer having an outer surface constituting the outer surface of said wall, at least one of said inner and outer surfaces being chosen from the class consisting of a smooth surface, a textured surface, a corrugated surface and a ribbed surface, said receptacle having an upper end and a lower end, and an openable closure for said upper end of said receptacle.

2. The receptacle claimed in claim 1 wherein said inner and outer layers comprise polyethylene layers, and said intermediate layer comprises an expanded polyethylene layer.

3. The receptacle claimed in claim 1 including a narrow, integral shelf extending inwardly of said receptacle from said inner wall layer near said upper end of said receptacle, an insulative pad having a peripheral shape conforming to said inner surface and being supported on said shelf, said insulative pad having a central opening.

4. The receptacle claimed in claim 3 wherein said inner and outer layers are of about the same thickness, said intermediate layer being about twice as thick as either of said inner and outer layers, said inner and outer layers completely enclosing said intermediate layer.

5. The receptacle claimed in claim 3 wherein said insulative pad and said plug are molded of polyethylene closed cell foam.

6. The receptacle claimed in claim 1 wherein each layer of said co-molded continuous wall provides certain characteristics to said receptacle, said outer layer providing characteristics of structural integrity and stress crack resistance and being colored to resist ultraviolet rays, said intermediate layer being an expanded layer and providing characteristics of high thermal insulative properties, rigidity and static physical strength, and said inner layer providing the characteristic of impact resistance and being of a light color to augment daylight or artificial light during inspection.

7. The receptacle claimed in claim 1 including a plurality of segments, each of said plurality of segments having a respective co-molded continuous wall, each said respective wall of said plurality of segments having a plastic inner layer providing the inner surface of said segment, a plastic outer layer providing the outer surface of said segment and an intermediate plastic layer having high thermal insulative properties.

8. The receptacle claimed in claim 7 wherein at least one of said inner and outer surfaces of said segment is chosen from the class consisting of a smooth surface, a textured surface, a corrugated surface and a ribbed surface.

9. The receptacle claimed in claim 1 wherein said continuous wall has an annular, outwardly directed, exterior flange thereon near said upper end whereby to fix the receptacle in its in-ground position when paving is located thereabout.

10. The receptacle claimed in claim 1 including an insulative pad supported by said receptacle, said insulative pad having a central opening, and a closure plug for said central opening.

11. The receptacle claimed in claim 10 wherein said insulative pad and said plug are molded of polyethylene closed cell foam.

12. An in-ground receptacle comprising a first segment, said first segment having a continuous wall defining a chamber for at least one of a fluid meter and a valve, said wall comprising a co-molded structure having a plastic inner layer, a plastic outer layer and an intermediate plastic layer having high thermal insulative properties, said inner layer having an inner surface constituting the inner surface of said wall, said outer layer having an outer surface constituting the outer surface of said wall, at least one of said inner and outer surfaces being chosen from the class consisting of a smooth surface, a textured surface, a corrugated surface and a ribbed surface, said receptacle having a first end and a second end.

13. The receptacle claimed in claim 12 wherein said inner and outer layers receptacle comprise polyethylene layers, and said intermediate layer comprises an expanded polyethylene layer.

14. The receptacle claimed in claim 12 including a narrow, integral shelf extending inwardly of said receptacle from said inner wall layer near said first end of said receptacle, an insulative pad having a peripheral shape conforming to the said inner surface and being supported on said shelf, said insulative pad having a central opening.

15. The receptacle claimed in claim 14 wherein said inner and outer layers are of about the same thickness, said intermediate layer being about twice as thick as either of said inner and outer layers, said inner and outer layers completely enclosing said intermediate layer.

16. The receptacle claimed in claim 12 wherein each layer of said co-molded continuous wall provides certain characteristics to said receptacle, said outer layer providing characteristics of structural integrity and stress crack resistance and being colored to resist ultraviolet rays, said intermediate layer being an expanded layer and providing characteristics of high thermal insulative properties, rigidity and static physical strength, and said inner layer providing the characteristic of impact resistance and being of a light color to augment daylight or artificial light during inspection.

17. The receptacle claimed in claim 12 including a plurality of segments, each of said plurality of segments having a respective co-molded continuous wall, each said respective wall of said plurality of segments having a plastic inner layer providing the inner surface of said segment, a plastic outer layer providing the outer surface of said segment and an intermediate plastic layer having high thermal insulative properties.

18. The receptacle claimed in claim 17 wherein at least one of said inner and outer surfaces of said segment is chosen from the class consisting of a smooth surface, a textured surface, a corrugated surface and a ribbed surface.

19. The receptacle claimed in claim 12 wherein said continuous wall has an annular, outwardly directed, exterior flange thereon near said first end whereby to fix the receptacle in its in-ground position when paving is located thereabout.

20. The receptacle claimed in claim 12 including an insulative pad supported by said receptacle, said insulative pad having a central opening.

* * * * *